(12) United States Patent
Pezeshki et al.

(10) Patent No.: US 12,487,415 B2
(45) Date of Patent: Dec. 2, 2025

(54) SYSTEMS USING MICROLED-BASED INTERCONNECTS

(71) Applicant: AvicenaTech Corp., Sunnyvale, CA (US)

(72) Inventors: Bardia Pezeshki, Sunnyvale, CA (US); Robert Kalman, Sunnyvale, CA (US); Alex Tselikov, Sunnyvale, CA (US)

(73) Assignee: AvicenaTech, Corp., Sunnyvale, CA (US)

( * ) Notice: Subject to any disclaimer, the term of this patent is extended or adjusted under 35 U.S.C. 154(b) by 0 days.

(21) Appl. No.: 18/436,939

(22) Filed: Feb. 8, 2024

(65) Prior Publication Data
US 2024/0302605 A1    Sep. 12, 2024

Related U.S. Application Data

(62) Division of application No. 17/145,096, filed on Jan. 8, 2021, now Pat. No. 11,914,200.

(60) Provisional application No. 62/960,543, filed on Jan. 13, 2020, provisional application No. 62/958,615, filed on Jan. 8, 2020.

(51) Int. Cl.
*G02B 6/42* (2006.01)

(52) U.S. Cl.
CPC .................................. *G02B 6/4204* (2013.01)

(58) Field of Classification Search
CPC .......................... G02B 6/4204; G02B 6/2804; G02B 6/29361; G02B 6/4246; G02B 6/4298; G02B 6/43; G02F 3/00; H04B 10/801
See application file for complete search history.

(56) References Cited

U.S. PATENT DOCUMENTS

| | | | |
|---|---|---|---|
| 5,335,361 A | 8/1994 | Ghaem | |
| 5,638,469 A | 6/1997 | Feldman et al. | |
| 5,848,214 A | 12/1998 | Haas et al. | |
| 7,400,801 B1 | 7/2008 | Tong et al. | |
| 7,459,726 B2 | 12/2008 | Kato et al. | |
| 7,915,699 B2 | 3/2011 | Krishnamoorthy et al. | |
| 8,148,202 B2 | 4/2012 | Krishnamoorthy et al. | |
| 2004/0159777 A1 | 8/2004 | Stone | |
| 2010/0238442 A1* | 9/2010 | Heng | G01N 15/1433 382/294 |
| 2013/0230280 A1 | 9/2013 | Kadar-Kallen | |
| 2016/0020353 A1 | 1/2016 | Chu | |

(Continued)

FOREIGN PATENT DOCUMENTS

| | | |
|---|---|---|
| CN | 102187601 A | 9/2011 |
| JP | 2011-014932 | 1/2011 |

(Continued)

OTHER PUBLICATIONS

Bing Wang et al., On-chip Optical Interconnects using InGaN Light-Emitting Diodes Integrated with Si-CMOS, In: Aais Communications and Photonics Conference 2014, Shanghai, China, Nov. 11-14, 2014, pp. 1-3.

(Continued)

*Primary Examiner* — Thanh Luu
*Assistant Examiner* — Mai Thi Ngoc Tran

(57) ABSTRACT

Optical interconnect topologies may be provided using microLEDs. The topologies may interconnect ICs. The optical interconnect topologies may be used in some instances in place of electrical busses.

3 Claims, 9 Drawing Sheets

(56) References Cited

U.S. PATENT DOCUMENTS

| | | |
|---|---|---|
| 2016/0172020 A1 | 6/2016 | Baker et al. |
| 2016/0233269 A1 | 8/2016 | Choi et al. |
| 2017/0059763 A1 | 3/2017 | Lucrecio et al. |
| 2017/0237516 A1 | 8/2017 | Welch |
| 2017/0272845 A1 | 9/2017 | Pezeshki et al. |
| 2017/0276874 A1 | 9/2017 | Kashyap et al. |
| 2018/0038680 A1 | 2/2018 | Reolon et al. |
| 2018/0227055 A1 | 8/2018 | Khatibzadeh et al. |
| 2018/0239096 A1 | 8/2018 | Houbertz et al. |
| 2018/0269191 A1 | 9/2018 | England et al. |
| 2019/0011652 A1 | 1/2019 | Chang |
| 2019/0033542 A1 | 1/2019 | Epitaux et al. |
| 2019/0049367 A1 | 2/2019 | Zou |
| 2019/0072720 A1 | 3/2019 | Heanue et al. |
| 2019/0189603 A1 | 6/2019 | Wang et al. |
| 2019/0312643 A1* | 10/2019 | Wijbrans ............... H04B 10/69 |
| 2021/0080664 A1 | 3/2021 | Pezeshki et al. |

FOREIGN PATENT DOCUMENTS

| | | |
|---|---|---|
| JP | 2012-215876 | 11/2012 |
| WO | WO 2010/048901 | 5/2010 |

OTHER PUBLICATIONS

Brian Corbett et al., Chapter Three—Transfer Printing for Silicon Photonics, Semiconductors and Semimetals, vol. 99, 2018, ISSN 0080-8784, pp. 43-70, https://doi.org/10.1016/bs.semsem.2018.08.001.

David A. B. Miller, Optical Interconnects, IAA Workshop, Jul. 22, 2008, pp. 1-26.

J. F. C. Carreira et al., Direct integration of micro-LEDs and a SPAD detector on a silicon CMOS chip for data communications and time-of-flight ranging, Optics Express, vol. 28, No. 5, Mar. 2, 2020, pp. 6909-6917.

Lars Brusberg et al., Optoelectronic Glass Substrate for Co-packaged Optics and ASICs, Optical Fiber Communication Conference, Mar. 12, 2020, San Diego, CA, pp. 1-24.

Lee et al., Low-Cost and Robust 1-Gbit/s Plastic Optical Fiber Link Based on Light-Emitting Diode Technology, Optical Society of America, 2008.

Lei Liu et al., On-chip optical interconnect on silicon by transfer printing, In: CLEO: Science and Innovations 2018, San Jose, California, USA, May 13-18, 2018, pp. 1-2.

Martin D. Dawson, Micro-LEDs for Technological Convergence between Displays, OpticalCommunications, & Sensing and Imaging Systems, SID Display Week 2020, Session 44, Invited paper No. 44.1, 27 pages.

Bamiedakis et al., Ultra-Low Cost High-Density Two-Dimensional Visible-Light Optical Interconnects, Journal of Lightwave Technology, IEEE, USA, vol. 37, No. 13, Jul. 1, 2019.

Roger Dangel et al., Polymer Waveguides Enabling Scalable Low-Loss Adiabatic Optical Couplingfor Silicon Photonics, IEEE Journal of Selected Topics in Quantum Electronics, vol. 24, No. 4, Jul./Aug. 2018, 11 pages.

Yahav et al., Multi-Gigabit Spatial-Divion Multiplexing Transmission Over Multicore Plastic Optical Fiber, Journal of Lightwave Technology, vol. 39, No. 8, Apr. 15, 2021, pp. 2296-2304.

Yurii Vlasov, Silicon photonics for next generation computing systems, Tutorial given at the European Conference on Optical Communications, Sep. 22, 2008.

Ziyang Zhang et al., Hybrid Photonic Integration on a Polymer Platform, Photonics 2015, 2, pp. 1005-1026.

International Search Report in related PCT Application No. PCT/US2021/012802 from International Searching Authority (KIPO) dated May 10, 2021.

Written Opinion in related PCT Application No. PCT/US2021/012802 from International Searching Authority (KIPO) dated May 10, 2021.

Office Action issued in related Chinese Application No. 202180008586.4 dated Jul. 31, 2023.

Extended European Search Report issued in related European Application No. 21738682.0 dated Apr. 9, 2024.

* cited by examiner

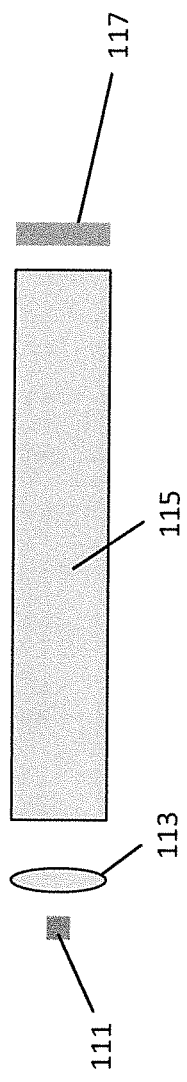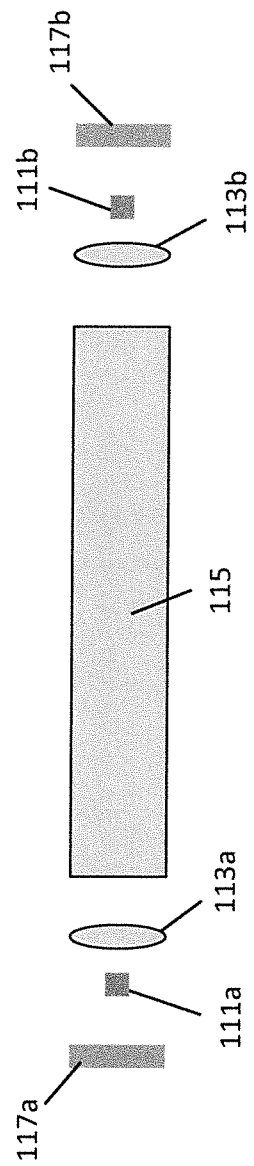

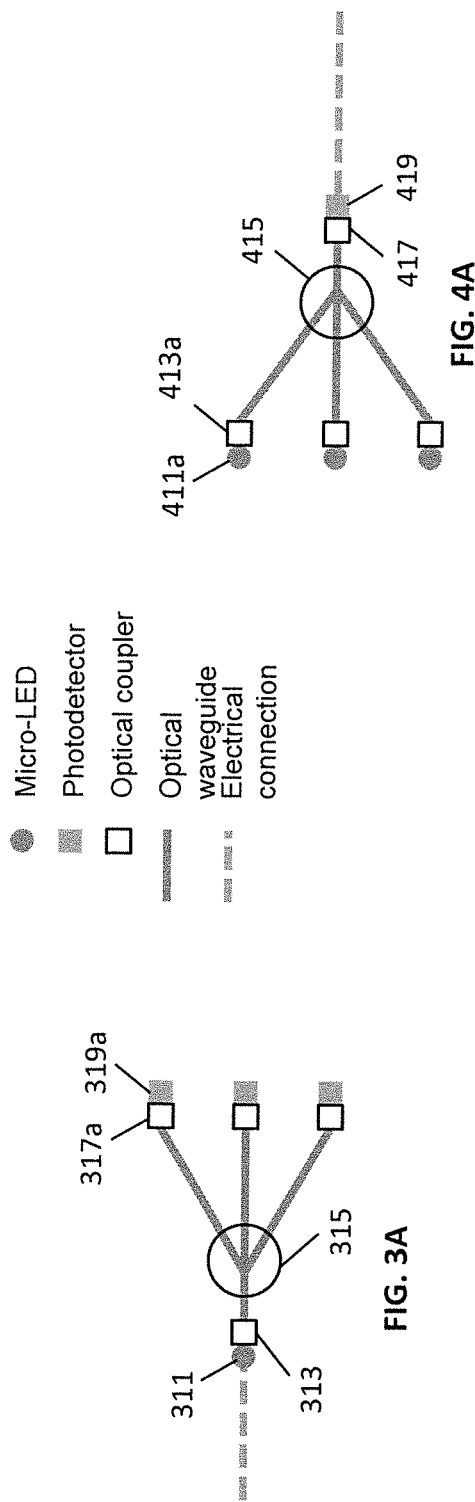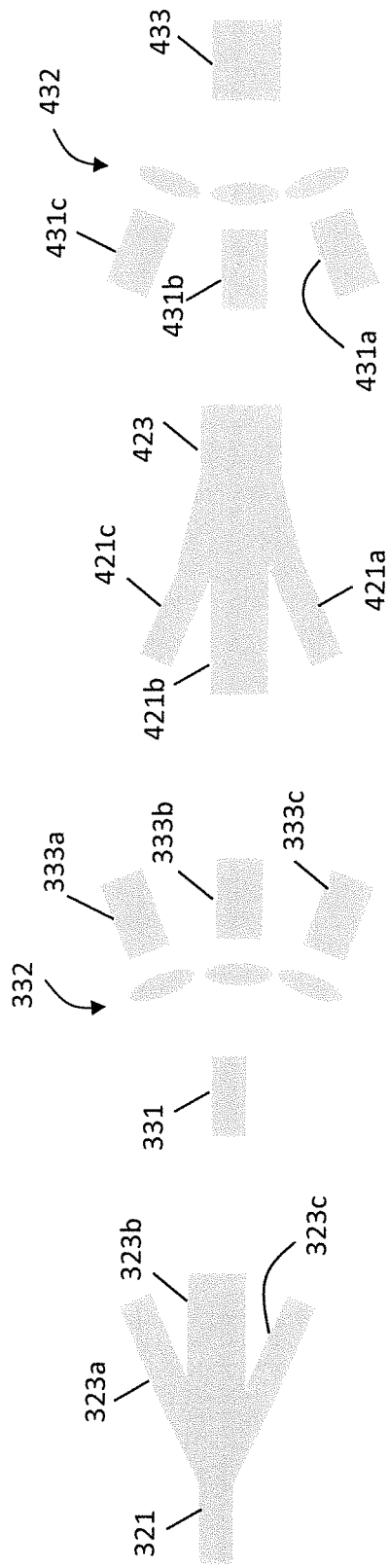

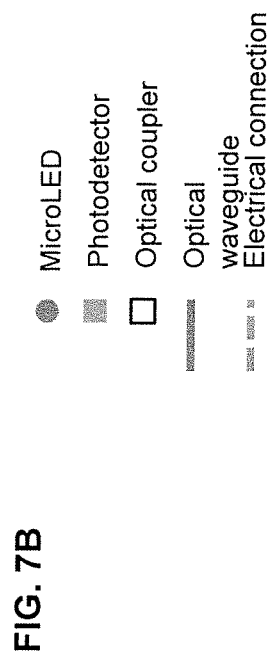
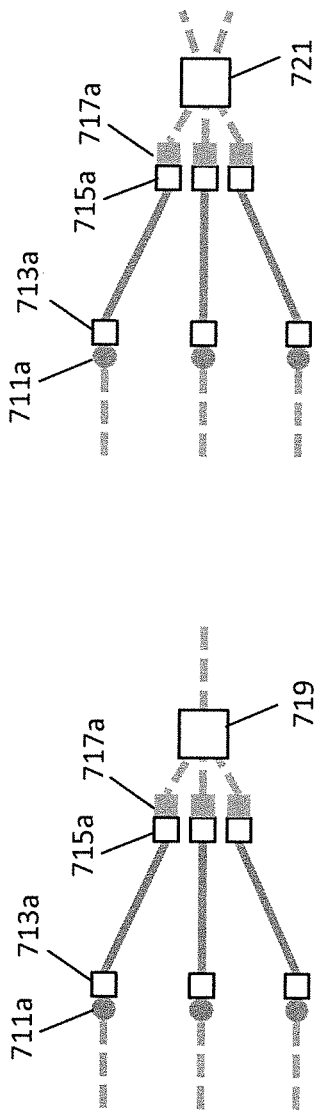
FIG. 7B
FIG. 7A
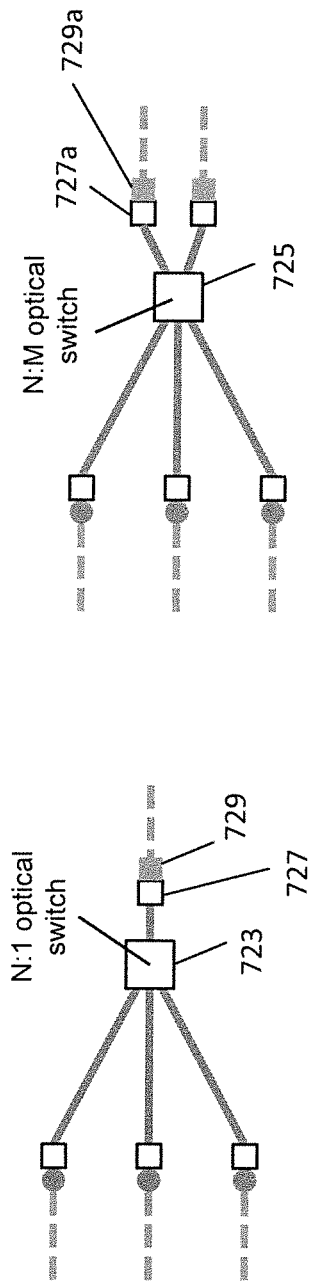
FIG. 7D
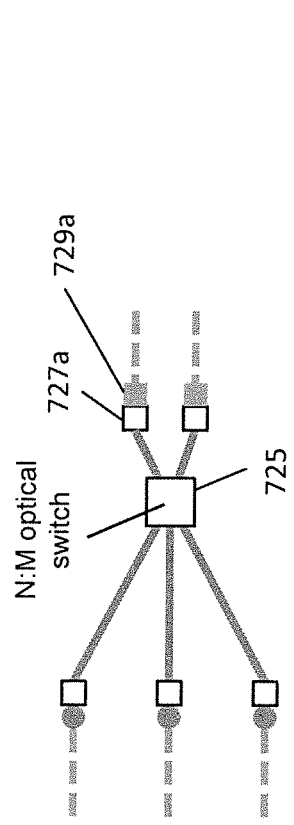
FIG. 7C

SYSTEMS USING MICROLED-BASED INTERCONNECTS

CROSS REFERENCE TO RELATED APPLICATIONS

This application is a divisional of U.S. patent application Ser. No. 17/145,096, filed on Jan. 8, 2021, which claims the benefit of the filing date of U.S. Provisional Patent Application No. 62/958,615, filed on Jan. 8, 2020, and 62/960,543, filed on Jan. 13, 2020, the disclosures of which are incorporated by reference herein.

FIELD OF THE INVENTION

The present invention relates generally to chip-to-chip interconnects, and more particularly to optical chip-to-chip interconnects making use of microLEDs.

BACKGROUND OF INVENTION

ICs have traditionally been connected by traces on printed circuit boards (PCBs). However, the required IC packaging and coarse PCB linewidth severely limits IC and interconnect density. More recently, ICs have been interconnected using silicon and organic interposers where bare IC die are connected by thin electrical lines. These interposers enable far higher IC and interconnect densities than PCBs but still impose significant limitations. For example, interconnect lengths of dense narrow lines (<1 um wide) are typically limited to <1 cm by ohmic losses and the energy required to charge the capacitance of longer lines. This, in turn, typically, restricts connections to nearest-neighbor ICs. In addition, even for connections that are only a few mm in length, drive power for chip-to-chip connections can become significant and constrain systems based on power dissipation. Further, the use of planar substrates for interposers significantly limits IC density, interconnect density and topologies, and power dissipation compared to what is possible if ICs can be located and interconnected in three-dimensional space.

BRIEF SUMMARY OF THE INVENTION

Some embodiments provide an optically-interconnected integrated circuit (IC) architecture, comprising: a first plurality of ICs; a plurality of sets of microLEDs, each set of the microLEDs being associated with and configured to be driven with signals from a corresponding one of the first plurality of ICs; a second IC; a plurality of photodetectors associated with and configured for provision of signals to the second IC; a plurality of sets of input waveguides, each set of the input waveguides being associated with and positioned to receive optical signals from microLEDs of corresponding ones of the first plurality of ICs and to provide optical signals to different fan-in regions; and a plurality of output waveguides, each of the plurality of waveguides positioned to receive optical signals from a different one of the fan-in regions and to provide optical signals to a different one of the plurality of photodetectors.

Some embodiments provide an optically-interconnected integrated circuit (IC) architecture, comprising: a first IC; a plurality of microLEDs associated with and configured to be driven with signals from the first IC; a plurality of input waveguides, each of the plurality of input waveguides positioned to receive light from a corresponding one of the microLEDs and to provide light to a corresponding one of a plurality of fan-out regions; a second plurality of ICs; a plurality of sets of photodetectors, each set of the photodetectors being associated with and configured for provision of signals to a corresponding one of the second plurality of ICs; a plurality of sets of output waveguides, each set of output waveguides positioned to provide optical signals to a corresponding different set of the photodetectors, each output waveguide of a set positioned to receive optical signals from a different fan-out region.

Some embodiments provide an optical interconnect, comprising: a first microLED; a multimode optical waveguide; a first lens positioned to couple light from the first microLED into a first end of the multimode optical waveguide; and a first photodetector positioned to receive light from a second end of the multimode optical waveguide. Some embodiments provide a microLED-based fan-out interconnect, comprising: a microLED; an input waveguide; a first lens positioned to couple light from the microLED into a first end of the input waveguide; a fan-out region at a second end of the input waveguide; a plurality of output waveguides positioned to receive light in the fan-out region from the microLED; and a plurality of photodetectors, each one of the plurality of photodetectors positioned to receive light from a corresponding one of the output waveguides. Some embodiments provide a microLED-based fan-in interconnect, comprising: a plurality of microLEDs; a plurality of input waveguides; a plurality of first lenses, each positioned to couple light from a corresponding one of the plurality of microLEDs into a first end of a corresponding one of the plurality of input waveguides; a fan-in region at second ends of the plurality of input waveguides; and an output waveguide positioned to receive light in the fan-in region from the plurality of microLEDs; and a photodetector positioned to receive light from the output waveguide.

These and other aspects of the invention are more fully comprehended upon review of this disclosure.

BRIEF DESCRIPTION OF THE DRAWINGS

FIG. 1a shows an optical link using a microLED, in accordance with aspects of the invention.

FIG. 1b shows a bidirectional optical link using microLEDs, in accordance with aspects of the invention.

FIGS. 3a-c show examples of optical fan-out interconnects, in accordance with aspects of the invention.

FIGS. 4a-c show examples of optical fan-in interconnects, in accordance with aspects of the invention.

FIGS. 7a-d show examples of tail-end switched interconnects implemented using microLEDs, in accordance with aspects of the invention.

DETAILED DESCRIPTION

Figure 10:
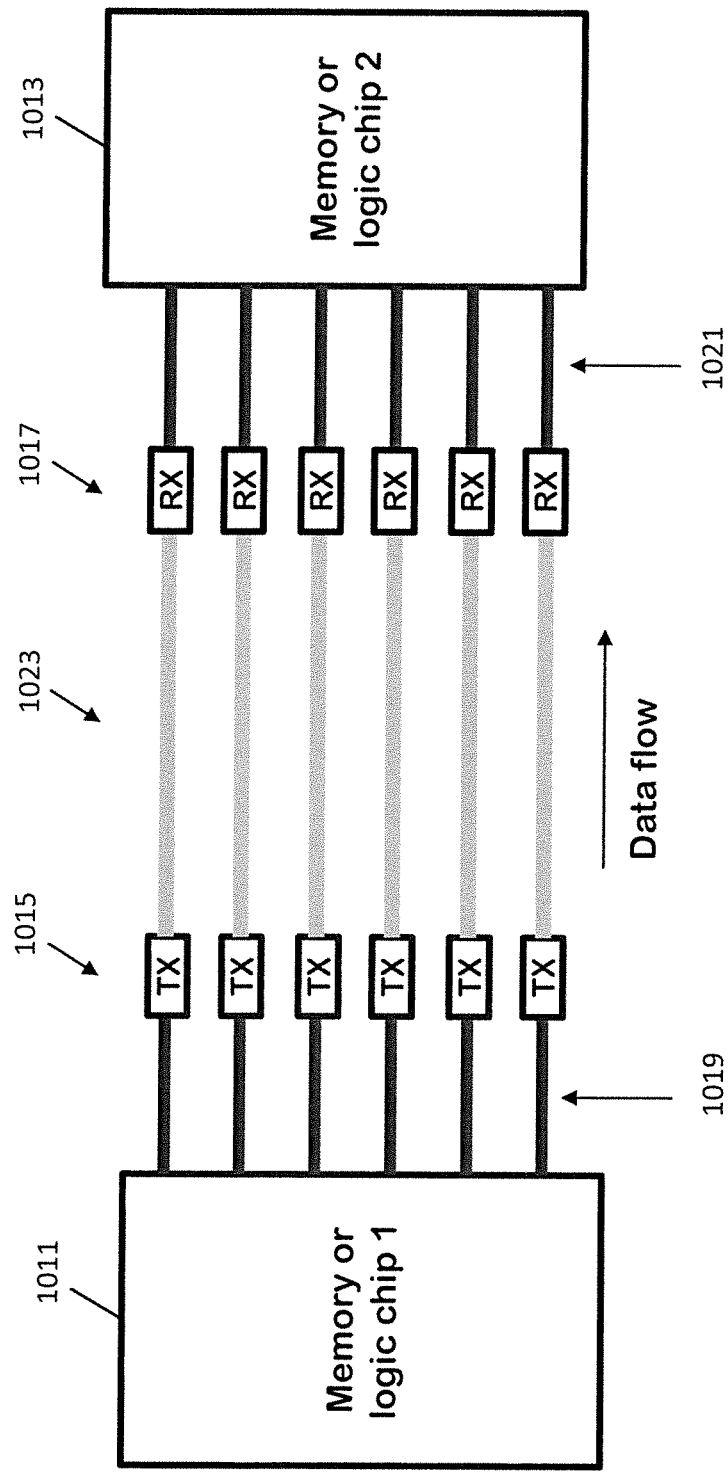
FIG. 10 shows an example of two chips in data communication, in accordance with aspects of the invention.

FIG. 10 shows two chips 1011, 1013 in data communication. In some embodiments the chips are microchips. In some embodiments the chips are part of a same multi-chip module. In some embodiments the chips are in a same package. In some embodiments the chips are on a same substrate, or coupled to the same substrate. The two chips are interconnected together, but instead of conventional electrical links, there are numerous transmitter (Tx) 1015 and receiver (Rx) 1017 blocks that convert the electrical signals to optical signals and back again. The links 1019 between the Tx blocks and the microchips are electrical, as are the links 1021 between the Rx blocks and the microchips. But the connections 1023 between the Tx blocks and Rx blocks are optical. The Tx blocks include microLEDs for generating the optical signals based on electrical signals, and the Rx blocks include photodetectors for generating electrical signals based on received optical signals. FIG. 10 shows individual Tx and Rx blocks, but multiple Tx and Rx blocks can be integrated together on a single integrated circuit.

Figure 11:
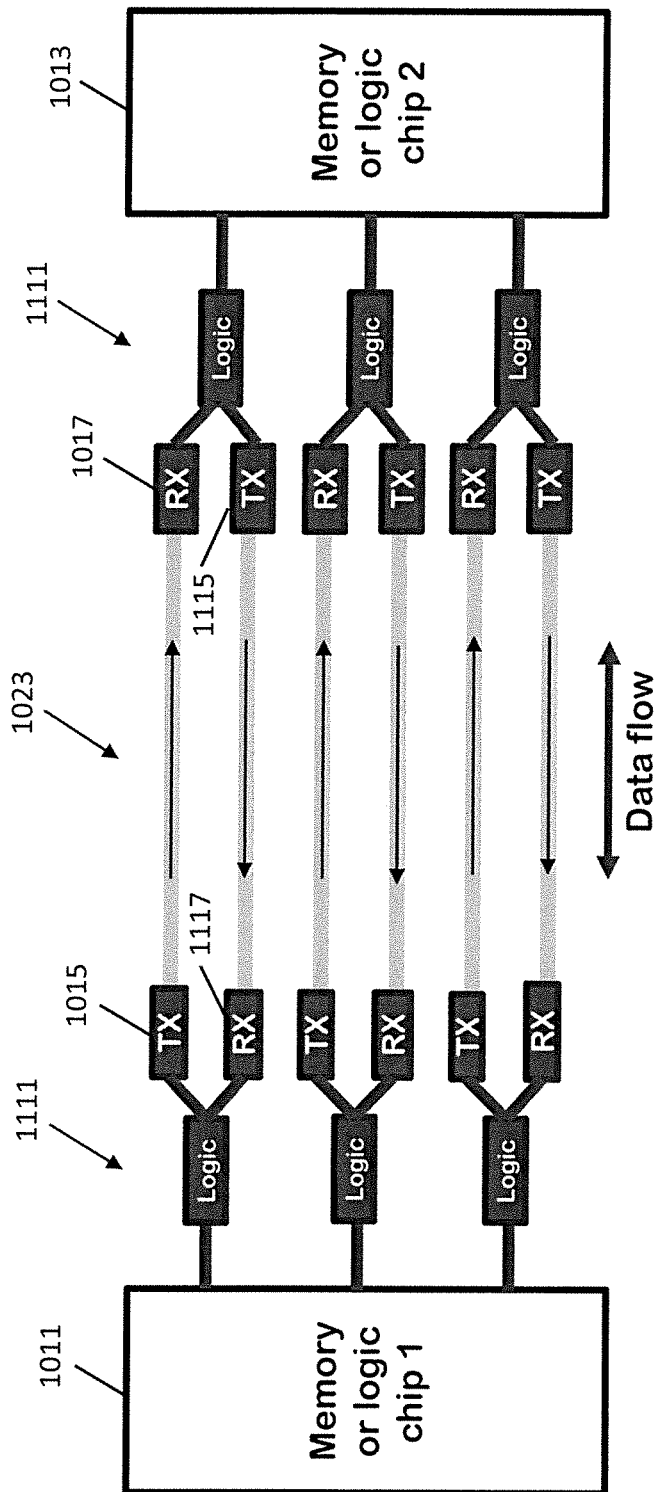
FIG. 11 shows a further example of two chips in data communication, in accordance with aspects of the invention.

Frequently microchips use the same electrical pin for both input and output, generally in half-duplex more, where either the electrical line is transmitting or it is receiving. Various handshaking routines may be used to transmit and receive using the same lines. The same can be applied in the optical domain as shown in FIG. 11. Here each electrical line is connected to a Tx block 1115 and an Rx block 1117. In some embodiments logic 1111 connects the two together, such that when data is being sent the Tx block is activated and when it is received, the Rx block is activated. In some embodiments a separate optical line or waveguide is used for transmission and another optical line or waveguide is used for reception, as is shown in the figure. Alternatively, in some embodiments a single waveguide or optical connection is used to carry data in both directions. The latter option may provide higher density, as fewer waveguides may be used. However, there may be some loss or "blocking" associated with using the same line for transmit and receive.

Figure 12:
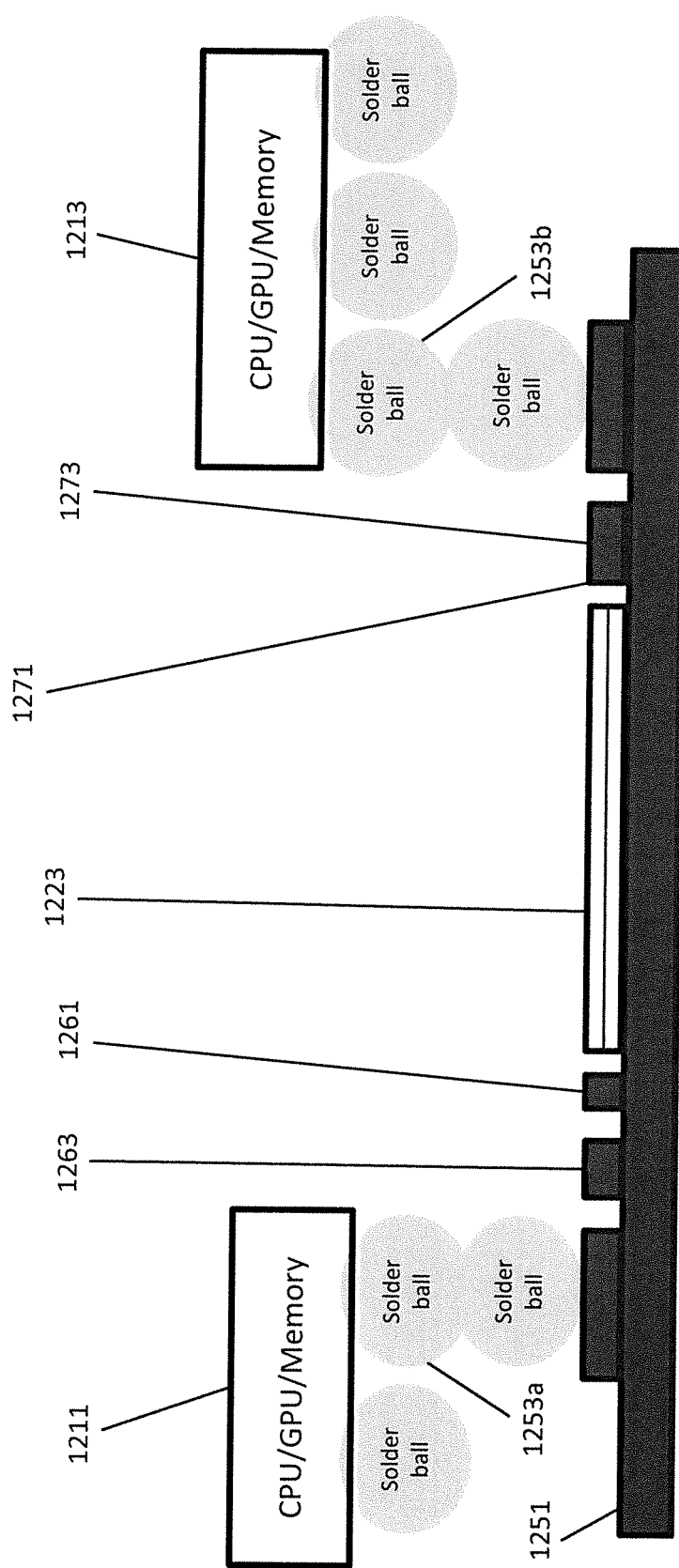
FIG. 12 shows a basic architecture of using microLEDs for chip to chip interconnects, in accordance with aspects of the invention.

FIG. 12 shows the basic architecture of using microLEDs for chip to chip interconnects in a 2D format. The various chips 1211, 1213 to be interconnected may be microbumped onto an optical interposer assembly that is comprised of a driver 1263, a microLED 1261, an optical propagation medium for example in the form of a waveguide 1223, photodetector 1271 and an amplifier 1273. In some embodiments the chips may be silicon processors. In some embodiments the chips may include a CPU, a GPU, and/or memory. The chips 1211, 1213 are mounted to the interposer, for example using solder balls and, in some embodiments, additional items. In FIG. 12, the chip 1211 may provide data to the driver 1263. The driver activates the microLED 1261 so as to generate light encoding the data, with the light entering a first end of the waveguide 1223 and passing through the waveguide to a second end of the waveguide. The photodetector 1271 is at the second end of the waveguide and generates electrical signals based on the received light. The amplifier amplifies the electrical signals from the photodetector, with the data of the amplified signals provided to the second chip. Though the complexity is more than that of just a "wire", the link can generally operate at lower powers since the capacitance at both the source and destination chip ends is generally greatly reduced relative to an electrical connection. The interposer 1251 may still have basic electrical lines such as power for the drivers and the receiver, ground line, and other control signals that are relatively slow. Mixed implementations are also possible, where some of the high-speed lines, for example some of the high speed lines between the chips 1211, 1213, are electrical and some are optical. There may be vias through the interposer substrate (e.g. through-chip-vias, TCVs or through-silicon-vias, TSVs) for many of the power and signal lines. There could be electrical connections from the back of the chip to the interposer through solder bumps (e.g. C4 bumps) and also from the top of the chip to the interposer through wirebonds. Thus, the optics can enhance an electrical interposer rather than completely replace all the electrical lines.

In various embodiments, the microLEDs and photodetectors may be communicatively coupled as discussed herein.

A microLED is made from a p-n junction of a direct-bandgap semiconductor material. A microLED is distinguished from a semiconductor laser (SL) in the following ways: (1) a microLED does not have an optical resonator structure; (2) the optical output from a microLED is almost completely spontaneous emission whereas the output from a SL is dominantly stimulated emission; (3) the optical output from a microLED is temporally and spatially incoherent whereas the output from a SL has significant temporal and spatial coherence; (4) a microLED is designed to be operated down to a zero minimum current, whereas a SL is designed to be operated above a minimum threshold current, which is typically at least 1 mA.

A microLED is distinguished from a standard LED by (1) having an emitting region of less than 100 µm×100 µm; (2) typically having positive and negative contacts on top and bottom surfaces, whereas a standard LED typically has both positive and negative contacts on a single surface; (3) typically being used in large arrays for display and interconnect applications. MicroLEDs generally have small etendue, allowing them to be efficiently coupled into small waveguides and/or imaged onto small photodetectors.

Optical Interconnect Topologies

Point-to-Point Links

A microLED can be used in implementing a unidirectional optical link. In FIG. 1*a*, a microLED 111 is coupled into a multimode waveguide 115 via a lens 113. The optical coupling between the microLED and waveguide may be implemented in a number of ways: butt-coupling; one or more lenses interposed between the microLED and waveguide; a curved mirror that collects the light from the microLED; or the microLED may be embedded in waveguide.

At a far end of the waveguide, light is incident on a photodetector (PD) 117. In FIG. 1*a*, the waveguide is butt-coupled to the PD. Coupling from the waveguide to the PD may be accomplished via the same coupling techniques mentioned above for coupling a microLED to a waveguide.

MicroLEDs can also be used to implement a bidirectional optical link where the waveguide supports two counter-propagating optical signals, as shown in FIG. 1*b*. At each end of a multimode waveguide 115, a microLED 111*a*,*b* and PD 117*a*,*b* are placed such that light is coupled into the waveguide from the microLED, while light propagating in the opposite direction is coupled to the PD. In principle, with an appropriate coupling assembly, e.g. lens 113*a*,*b*, all of the light from the microLED can be coupled to the waveguide. In some embodiments, at each end, or at least one of them, a reflector (not shown in FIG. 1b) or other light blocking device or material may be positioned between the microLED and the PD at the end. The reflector or other light blocking device may be positioned so as to block light from the microLED at the end from reaching the PD, while still allowing light received over the optical to reach the PD at that end. In coupling from the waveguide to the PD, some of the light may be lost because it is blocked by microLED (and/or reflector or other light blocking device). However, by utilizing a PD that is significantly larger than the microLED (and/or reflector or other light blocking device), this excess loss can be made relatively small. In the specific example shown in FIG. 1b, the lens and PD are placed relative to the LED such that the microLED's light is efficiently coupled into the waveguide while only a small fraction of the light emerging from the end of the waveguide is obstructed by the microLED and thus most of the light is incident on the PD.

In chip-to-chip interconnect applications, waveguides with small transverse dimensions may be used in some embodiments. Waveguides with small transverse dimensions may allow for very high connection densities. The small etendue of a microLED allows the microLED to be efficiently coupled to a waveguide with a small transverse dimension. This coupling efficiency can be enhanced by mirrors (both flat and curved) and lenses, which can capture a significant fraction of the microLED's light and adapt the optical distribution's numerical aperture (NA) to match that of the waveguide.

In some embodiments the waveguides may be confined to lie in a plane. Unlike electrical connections, optical waveguides may cross over each other with sufficiently low crosstalk levels that the optical links are not significantly impaired. The optical crosstalk between crossing waveguides is a function of waveguide NA and the crossing angle.

Alternatively or in addition, in some embodiments the waveguides may be routed through a three-dimensional (3D) space. For example, the waveguides may be fabricated in the volume of a glass block, or may be in flexible fibers or ribbons that can be twisted into complex 3D routes. This potentially enables a much higher connection density and much more complex connection topologies.

An array of N interconnects may be used to implement an N-bit wide data path. This array, including microLEDs, waveguides, and PDs may physically lie in a plane or may be in 3D space.

Guided Wave and Free-Space Propagation

Figure 2:
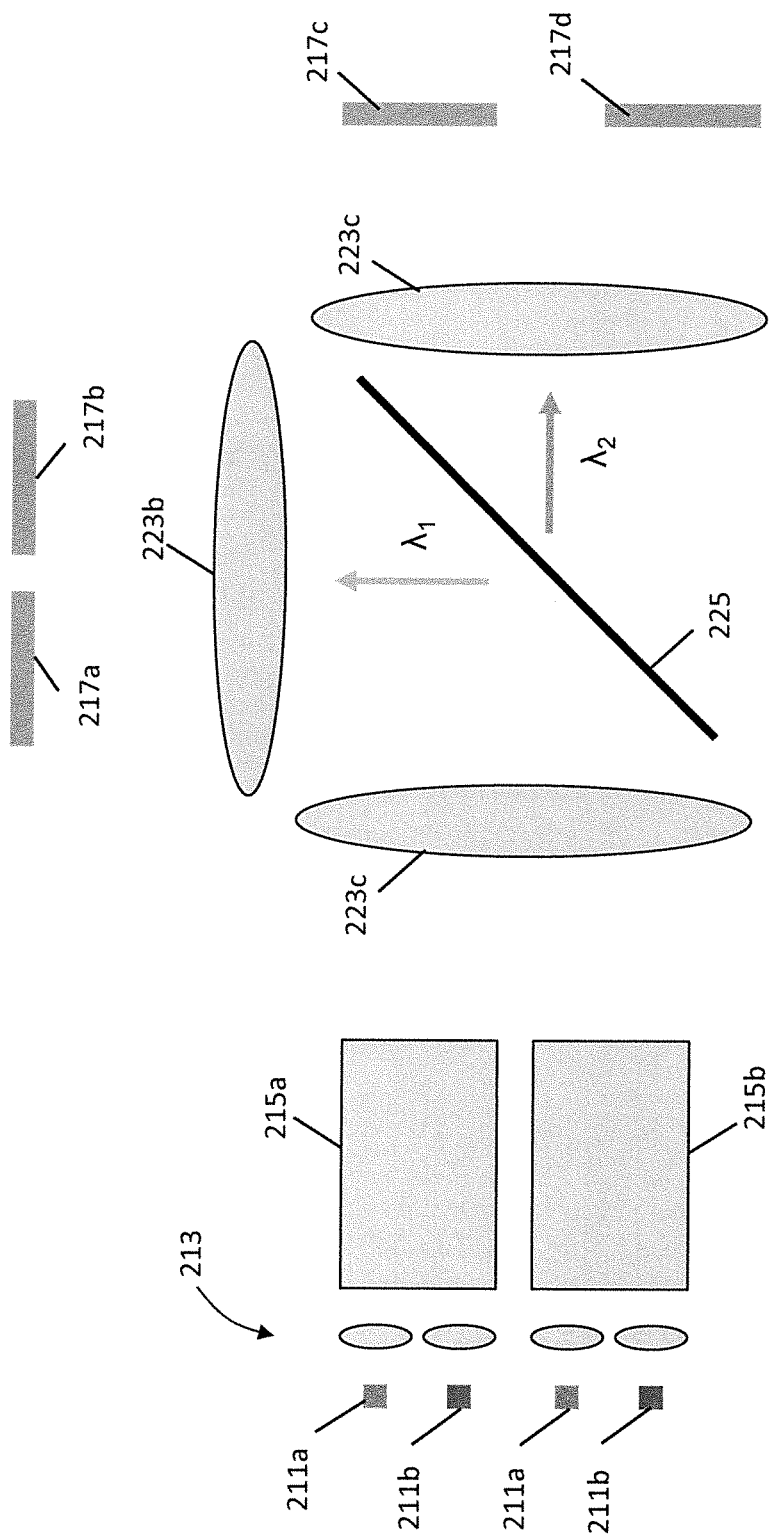
FIG. 2 shows an example of use of mixed guided wave and free-space optical elements for optical links, in accordance with aspects of the invention.

Light from a microLED may propagate through a sequence of guided wave and free-space optical elements. In FIG. 2, light from two LEDs 211a,b (shown in two positions for ease of understanding), which emit light at different wavelengths, is coupled via free-space and lenses 213 into each element of an array of optical waveguides 215a,b. The light propagates to the far end of the waveguides, where the light is coupled back into free-space and coupled onto output PDs 217a-d, using lenses 223a-c that are large enough to capture the light from the entire waveguide array in some embodiments. In some embodiments, and as illustrated in FIG. 2, a dichroic mirror 225 may be used. A dichroic mirror reflects light only at certain wavelengths, allowing light from microLEDs at different wavelengths to be routed along different optical paths.

The example of FIG. 2 is just one example of the ability to mix guided wave and free-space propagation. In the free-space propagation sections, arrays of small optical elements may be used that map 1:1 to microLED or PD arrays, or larger optical element may be used that span larger numbers of array elements.

Fan-Out Interconnects

A microLED may be used to implement a 1-to-N fan-out interconnect, for example as illustrated in FIG. 3a. A microLED 311 is driven by an input electrical signal. The output optical signal from the microLED is coupled, for example by an optical coupler 313, into a waveguide, for example using one of the optical coupling techniques discussed herein. The waveguide couples to a fan-out region 315. In FIG. 3a, output waveguides pass light to photodetectors, e.g. photodetector 319a, with an optical coupler, e.g. optical coupler 317a, coupling the light to the photodetector. The fan-out region may be an all-guided wave implementation, for example as illustrated in FIG. 3b. In this implementation, the input waveguide 321 has a branching region where light is split N ways into N output waveguides, e.g. output waveguides 323a-c. Each output waveguide carries some fraction of the input power such that the sum of the optical power in the N output branches equals the input optical power minus any excess losses; with proper design and low-attenuation waveguides, this excess loss can be almost arbitrarily low. The power launched into each output waveguide is a complicated function of the input optical distribution to the branching region and the details of each branch, including width and angle relative to the input waveguide's axis. These parameters may be manipulated to engineer a desired power distribution among the output branches.

Alternatively, the fan-out may be a hybrid guided wave+ free-space implementation, for example as illustrated in FIG. 3c. In this implementation, light from the input waveguide 331 spreads out in free-space and is incident on lenses 332, each of which couples light into a corresponding output waveguide, e.g. output waveguides 333a-c. As with the guided-wave fan-out case, the waveguides, lenses, branching angles, and other parameters can be engineered to achieve various power distributions across the output waveguides and to drive excess losses to very low levels (<<1 dB).

Outputs of the waveguides may be coupled to a photodetector placed at the end of each output waveguide, for example using one of the techniques discussed herein.

Fan-In Interconnects

MicroLEDs may be used to implement an M-to-1 fan-in interconnect, for example as illustrated in FIG. 4a. Each microLED is driven by an input electrical signal. The output optical signal from each microLED, e.g., microLED 411a, is coupled into an input waveguide using one of the techniques enumerated above. Each of the M input waveguides may have different properties, and is connected to a fan-in coupler or region 415 that may utilize various guided wave and/or free-space implementations. The fan-in coupler has a single output waveguide. In FIG. 4a the output waveguide leads to an optical coupler 417 and photodetector 419. The coupling between each input waveguide and the output waveguide can theoretically be lossless if the etendue of the optical distribution in the output waveguide is greater than or equal to the sum of the input optical distributions. If the etendue of the output waveguide is too small and/or the fan-in coupler is not properly designed, there may be a finite coupling loss from each input waveguide to the output waveguide, where the loss value is a complicated function of the input optical distribution to the fan-in region, the fan-in region's design, and the output waveguide's characteristics.

Outputs of the waveguides may be coupled to a photodetector placed at the end of each output waveguide, for example using one of the techniques discussed herein.

FIG. 4b shows an example of a guided-wave fan-in. In the guided-wave fan-in of FIG. 4b, a plurality of input waveguides 421a-c combine into an output waveguide 423. FIG. 4c shows an example of a hybrid guided wave+free-space fan-in, where light from each input waveguide 431a-c is coupled into the output waveguide 433 via a lens 432.

An M-to-1 fan-in interconnect can be implemented without input waveguides simply by coupling M microLEDs directly into an optical waveguide. The coupling from each of the microLEDs may be accomplished via one of the techniques discussed herein. In some embodiments the optical waveguide's transverse dimensions are large enough to accommodate all of the microLEDs' coupling assemblies. This type of fan-in does not require a separate input waveguide per microLED or an explicit fan-in region.

Another M-to-1 fan-in interconnect can be implemented by using optical coupling components that span multiple LEDs. For instance, M microLEDs may be distributed as a two-dimensional array. One or more lenses, each with a diameter greater than that of the optical distribution from microLED array, may be used to couple the light from all elements of the microLED array into an optical waveguide. This obviates the need for input waveguides or an explicit fan-in region.

Figure 5:
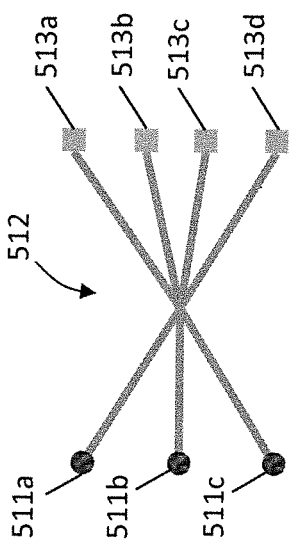
FIG. 5 shows an optical M-to-N interconnect comprised of an M-to-1 fan-in interconnect combined with a 1-to-N interconnect, in accordance with aspects of the invention.

An M-to-1 fan-in interconnect may be combined with a 1-to-N interconnect to implement an M-to-N interconnect, for example as illustrated in FIG. 5. Each microLED 511a-c is driven by an input electrical signal. The output optical signal from each microLED is coupled into an input waveguide. Each of the M input waveguides, which may have different properties, is connected to a coupler region 512. N waveguides are connected to the output of the coupler region, each of which may have different properties, with the N waveguides leading to photodetectors 513a-d in FIG. 5. The optical power coupling from each input waveguide to each output waveguide may be expressed by an M×N coupling matrix. The value of each matrix element is a complicated function of the optical distribution in the relevant input waveguide, the characteristics of the coupling region, and the characteristics of the relevant output waveguide. The sum of the coefficients in each row of the matrix are less than or equal to one, where one holds for a lossless coupling. The waveguides may be coupled to a photodetector placed at the end of each output waveguide, for example using one of the schemes discussed herein.

The coupler region in an M-to-N coupler may be implemented via various combinations of the fan-in and fan-out coupler schemes discussed herein.

By contrast to signal splitting and combining done in electronic interconnects, optical interconnects do not suffer from impedance matching problems. An optical splitter or combiner can provide optical power splitting and combining with low loss that is independent of the modulation bandwidth of the optical signal being split up to modulation frequencies of $\gg 1$ THz.

Bidirectional Fan-In/Fan-Out Interconnects

Bidirectional links can be established across a fan-out coupler as described in the point-to-point links section above, where both a microLED and photodetector are coupled to the end of each input and output waveguide. Such a system provides a fan-out interconnect in one direction and a fan-in interconnect in the other direction. The various guided wave and free-space fan-out coupler architectures can be used.

Switching and Multiplexing

Figure 6:
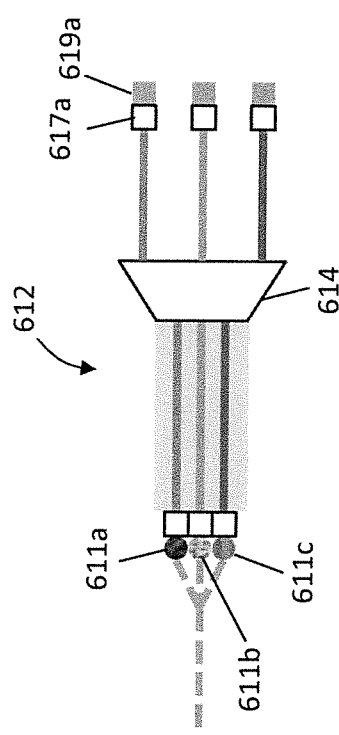
FIG. 6 shows multiple logical communication channels implemented using wavelength multiplexing of optical signals from multiple microLEDs, in accordance with aspects of the invention.

Multiple logical communication channels can be implemented by wavelength multiplexing the optical signals from multiple microLEDs, for example as shown in FIG. 6. The light from multiple microLEDs 611a-c may be coupled into a waveguide 612, where each microLED emits light in a different wavelength range than the other microLEDs. The light from the multiple LEDs may be coupled together using any of the M-to-1 fan-in schemes enumerated above. At the output end of the waveguide, a wavelength-dispersive optical element 614 is used to spatially separate the optical signals from the different microLEDs. This dispersive optical element may be one or more cascaded infinite impulse response (IIR) filter elements such as a thin-film filter or a Fabry-Perot resonator, or a finite impulse response (FIR) filter element such as a reflective or refractive grating. Once spatially separated, each of the optical signals may be coupled, for example using a optical coupler 617a to a photodetector 619a or into an optical waveguide using one of the optical coupling techniques discussed herein.

MicroLEDs may be used to implement a tail-end switched interconnect, for example as illustrated in FIGS. 7a-d. Each of N microLEDs is driven by an input electrical signal. The output optical signal from the microLED is coupled into a waveguide. The waveguide is coupled by an optical coupler 715a, 727, 727a to a photodetector 717a, 729, 729a placed at the end of each output waveguide and is accomplished using one of the schemes enumerated above. In FIGS. 7a and 7b, the outputs of the N photodetectors 717a are connected to an electrical switch 719, 721 which may be an N:1 switch (FIG. 7a). The switch allows one of the signals to be selected; this scheme is often referred to as "tail-end switching." Tail-end switching can generalized to use an N:M (M allowed to be N, in some embodiments) electrical switch (FIG. 7b).

An optical switch can also be used tail-end switching. This architecture differs from the electrically-switched scheme discussed above in that the N input optical waveguides are connected to an all-optical switch with N inputs and M outputs. Each output waveguide is coupled to a PD using one of the optical coupling schemes enumerated above. FIG. 7c shows the use of an N:1 optical switch 723, while FIG. 7d shows the more general case of an N:M optical switch 725.

Optically-Interconnected IC Architectures

The microLED interconnect topologies discussed herein can be used to implement various connections between ICs. IC connections are frequently in the form of wide busses. When implementing busses with fan-out and fan-in in a plane, in some embodiments many waveguides may cross. It is possible for optical waveguides to cross each other with low crosstalk; crosstalk can be minimized by increasing the crossing angle (minimum is for a right angle crossing) and by decreasing the NA of the waveguide. If waveguides are routed in 3D then waveguide crossings can be prevented, or numbers of waveguide crossings may be reduced.

Figure 9:
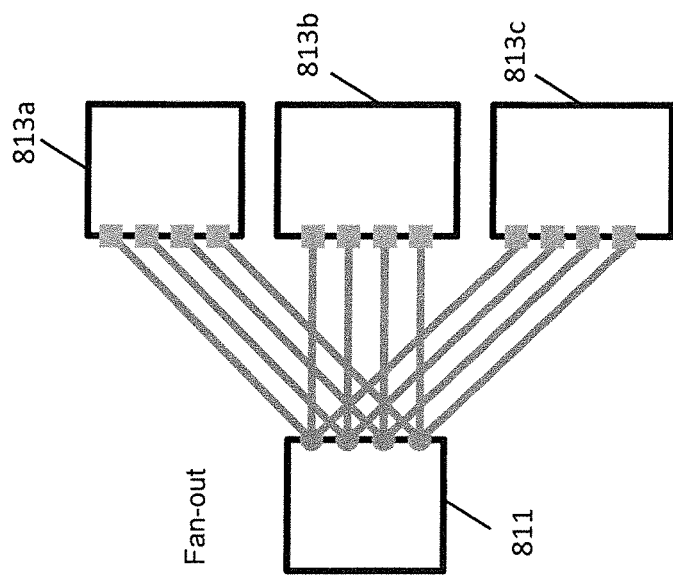
FIG. 9 illustrates the use of a microLED-based fan-in to connect the output of multiple ICs to the inputs of one other IC, in accordance with aspects of the invention.

A microLED fan-out can be used to connect the output of one IC 811 to the inputs of multiple other ICs 813a-c, for example as illustrated in FIG. 9. In some embodiments this allows for parallel processing of the data that is broadcast to the multiple ICs.

A microLED fan-in can be used to connect the outputs of multiple ICs 811a-c to the input of an IC 813. This may be useful in various switching architectures including cross-connects and Clos networks. For fan-ins, switching may be accomplished by turning on the microLEDs at one of the N output ICs and turning off the microLEDs at the other N−1 output ICs.

Figure 8:
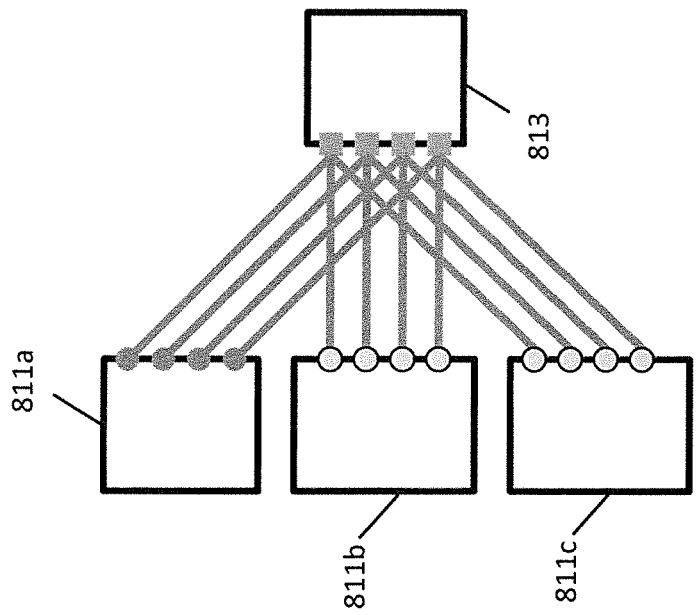
FIG. 8 illustrates the use of a microLED-based fan-out to connect the output of one IC to the inputs of multiple other ICs, in accordance with aspects of the invention.

Dense optical interconnects can break out of the usual two-dimensional (2D) planar interconnect constraint through the use of flexible waveguides and/or optical waveguides formed in a three-dimensional (3D) medium. The fan-out and fan-in optical connections in FIG. 8 and FIG. 9 can be implemented with 3D optical interconnects. The expansion to 3D interconnects, in some embodiments, allows for high-density, highly interconnected architectures that are difficult or impossible to implement in 2D interconnects. These include high-dimensionality hypercubes and large perfect shuffles in multiple dimensions.

Although the invention has been discussed with respect to various embodiments, it should be recognized that the invention comprises the novel and non-obvious claims supported by this disclosure.

What is claimed is:

1. An optical interconnect, comprising:
a pair of first microLEDs;
a pair of second microLEDs, the pair of second microLEDs configured to emit light at a different wavelength than the pair of first microLEDs;
a multimode optical waveguide;
a pair of first lenses positioned to couple light from the pair of first microLEDs into a first end of the multimode optical waveguide;
a pair of second lenses positioned to couple light from the pair of second microLEDs into the first end of the multimode optical waveguide;
a dichroic mirror configured to reflect light at the different wavelength emitted by the pair of second microLEDs and pass light at a wavelength emitted by the pair of first microLEDs, the dichroic mirror positioned to receive light from a second end of the multimode optical waveguide;
a pair of first photodetectors positioned to receive light passed by the dichroic mirror; and
a pair of second photodetectors positioned to receive light reflected by the dichroic mirror.

2. The optical interconnect of claim 1, wherein the pair of first microLEDs and the pair of second microLEDs are integrated on a first integrated circuit.

3. The optical interconnect of claim 1, wherein the pair of first photodetectors and the pair of second photodetectors are integrated on a second integrated circuit.

* * * * *